(12) United States Patent
Malek et al.

(10) Patent No.: US 7,765,467 B2
(45) Date of Patent: Jul. 27, 2010

(54) UNDOING PENDING CHANGES APPLIED TO WEB PAGES

(75) Inventors: Alexander H. Malek, Seattle, WA (US); Zhenguang Chen, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 1207 days.

(21) Appl. No.: 11/348,876

(22) Filed: Feb. 7, 2006

(65) Prior Publication Data

US 2006/0129926 A1 Jun. 15, 2006

Related U.S. Application Data

(63) Continuation-in-part of application No. 10/170,282, filed on Jun. 12, 2002, now Pat. No. 7,143,344.

(51) Int. Cl.
*G06F 17/24* (2006.01)

(52) U.S. Cl. .................. 715/234; 715/255; 715/760

(58) Field of Classification Search ......... 715/229–232, 715/234, 236, 273, 711, 715, 760, 768, 808–809, 715/844, 255
See application file for complete search history.

(56) References Cited

U.S. PATENT DOCUMENTS

| | | | | |
|---|---|---|---|---|
| 6,081,829 | A * | 6/2000 | Sidana | 709/203 |
| 6,185,587 | B1 * | 2/2001 | Bernardo et al. | 715/234 |
| 6,529,960 | B2 * | 3/2003 | Chao et al. | 709/238 |
| 6,601,057 | B1 | 7/2003 | Underwood | |
| 6,643,652 | B2 | 11/2003 | Helgeson | |
| 6,687,873 | B1 | 2/2004 | Ballantyne | |
| 6,745,224 | B1 * | 6/2004 | D'Souza et al. | 709/202 |
| 6,799,299 | B1 | 9/2004 | Li | |
| 7,096,418 | B1 * | 8/2006 | Singhal et al. | 715/205 |
| 7,143,344 | B2 | 11/2006 | Parker | |
| 7,472,339 | B2 * | 12/2008 | Bauchot | 715/214 |
| 2001/0044811 | A1 | 11/2001 | Ballantyne | |
| 2002/0073236 | A1 | 6/2002 | Helgeson | |
| 2002/0085020 | A1 | 7/2002 | Carroll | |
| 2003/0120672 | A1 * | 6/2003 | Bingham | 707/100 |
| 2003/0120686 | A1 * | 6/2003 | Kim et al. | 707/200 |

(Continued)

OTHER PUBLICATIONS

Einsenberg, 'Using XSL Formatting Objects, Part 2', XML.com, http://www.xml.com/pub/a/2001/01/24/xsl-fo/index.html, Jan. 2001.*

(Continued)

*Primary Examiner*—Cesar B Paula
(74) *Attorney, Agent, or Firm*—Workman Nydegger (57) ABSTRACT

An efficient approach is provided for handling changes made to the appearance of data in a Data View within a Web page editing program. Instead of immediately modifying the data to reflect each change entered by a user, the changes are accumulated until the user pauses in interacting with the data for a predefined time interval. The one or more changes modify Extensible Stylesheet Language Transformations (XSLT) code that is then employed for producing hypertext markup language (HTML) used in rendering the data within a window of a browser program. The user can cancel the update process, which is carried out in a separate thread, causing the data to be returned to its state before the update began. A user can also select different options that affect the appearance of a preview format used in the Data View.

17 Claims, 9 Drawing Sheets

U.S. PATENT DOCUMENTS

2003/0135825 A1 7/2003 Gertner
2004/0205551 A1 10/2004 Santos
2004/0205571 A1 10/2004 Adler

OTHER PUBLICATIONS

Office Action dated Nov. 17, 2004 cited in U.S. Appl. No. 10/170,282 {Copy Attached}.
Office Action dated Jun. 2, 2005 cited in U.S. Appl. No. 10/170,282 {Copy Attached}.
Office Action dated Dec. 20, 2005 cited in U.S. Appl. No. 10/170,282 {Copy Attached}.
Notice of Allowance dated Jul. 12, 2006 cited in U.S. Appl. No. 10/170,282 {Copy Attached}.
"XLST Designer", http://www.xmlspy.com/products_xsl.html, printed on Apr. 25, 2002, 4 pages.
"XSL Editor and XSLT Editor", http://www.xsl.xmlspy.com, printed on Apr. 25, 2009, 4 pages.
"XML Editor with Intelligent Editing", http://www.xmlspy.com/features_editing.html, printed on Apr. 25, 2002, 1 page.
"XSL Stylesheet Editor Technology Preview". http://www7.software.ibm.com/vad.nsf/Data/Document4639, Copyright 2000, 2001 IBM, printed on Apr. 25, 2002, 7 pages.
"Stylus Studio Product Information", http://www.exceloncorp.com/products/stylusstudio/productinfo.asp?page=3, Copyright 2002 eXcelon Corporation, printed on Apr. 25, 2002, 3 pages.

* cited by examiner

Frosted View:

FIG. 7

```
<BREAKFAST-MENU>
                                                    220
<FOOD>

<NAME>Belgian Waffles</NAME>

</FOOD>

<FOOD>

<NAME>Strawberry Belgian Waffles</NAME>

</FOOD>

<FOOD>

<NAME>Berry-Berry Belgian Waffles</NAME>

</FOOD>

<FOOD>

<NAME>French Toast</NAME>

</FOOD>

<FOOD>

<NAME>Homestyle Breakfast</NAME>

</FOOD>

</BREAKFAST-MENU>
```

FIG. 8

```
<table border="0" width="100%" cellpadding="2" cellspacing="0">
<tr valign="top">
<th nowrap="true">NAME</th>
</tr>
<xsl:for-each select="/BREAKFAST-MENU/FOOD">
<tr>
<td><xsl:value-of select="NAME"/></td>
</tr>
</xsl:for-each>
</table>
```

NAME

Belgian Waffles
Strawberry Belgian Waffles
Berry-Berry Belgian Waffles
French Toast
Homestyle Breakfast

UNDOING PENDING CHANGES APPLIED TO WEB PAGES

RELATED APPLICATIONS

This application is a continuation-in-part of a patent application, Ser. No. 10/170,282, filed on Jun. 12, 2002, and issued as U.S. Pat. No. 7,143,344, on Nov. 28, 2006, the benefit of the filing date of which is hereby claimed under 35 U.S.C. §120.

BACKGROUND

A transformation stylesheet defines how to transform a source document into an output document. For instance, an eXtensible Stylesheet Language (XSL) listing includes a set of rules that determine how to transform a source extensible Markup Language (XML) document into an output document. The output document may also be an XML document, or may be another type of document, such as a Hypertext Markup Language (HTML) document, or a Portable Document Format (PDF) document. Typically, an XSL stylesheet defines the formatting style of the output document, such as text color, line spacing, etc. However, the XSL stylesheet may also define alterations that transform the structure of the source document into a different structure. For example, a structure of nodes in a source XML document may be transformed according to the XSL stylesheet to produce an output XML document with nodes arranged in a different order, or replaced with different nodes altogether. Similarly, the structure of a source XML document may be transformed according to the XSL stylesheet to produce an output HTML document that is structurally different and not simply just a translation of the XML into HTML. Thus, a source document can not only be transformed into an output document according to formatting rules that are included in an XSL stylesheet, but more broadly, the XSL stylesheet can be used to transform the source document in many other aspects, beyond just formatting. Transformation rules provided in an XSL stylesheet are particularly useful, because an XSL stylesheet can be employed to transform various source documents containing different information into a single desired uniform output structure and format. An XSL stylesheet is also especially useful for transforming a large amount of source data into a structure and format desired for display in a Web browser program.

Creating Web page "views" of database data is difficult and often very computer intensive. For example, if trying to create a view of a 1000 record database table, the user experience when employing a conventional Web page creation and editing program can be very slow and tedious. Users can create custom Web page "views" of their data, for example, from an XML file, a database table, or a SharePoint™ list. The experience when creating a Data View can be completely "what-you-see-is-what-you-get" (WYSIWYG), i.e., the end-user can be shown exactly how the Web page and the inserted data will look at runtime when viewed in a window of a browser program. From an architectural standpoint, a Data View is built upon Extensible Stylesheet Language Transformations (XSLT), which is a standard for converting XML data to HTML. The Web page creation and editing program can provide automatic generation of XSLT based on formatting that the user does in a design mode. Specifically, when the user makes changes to the data in the design mode, the Web page creation and editing program updates the XSLT to represent the new look and the user can see the data in the Data View as if viewing the data in the Web page within a browser window.

However, because a WYSIWYG tool does dynamic XSLT generation, including the use of actual data, it can cause certain performance and user experience challenges. For example, every change made to the data by a user will typically cause a new XSLT generation to occur so that the change can promulgate back into the HTML that is used to create the Data View, making simple operations such as typing appear sluggish and very unresponsive. XSLT generation for complicated views and large data sets can be very computationally expensive, causing the Web page creation and editing program to appear to be hung. Lastly, sometimes a "WYSIWYG" view is not what the user wants—for example, when a data set is sparse (with rows of data having no values for some of the fields), or very large, the user will likely find that using real data during the editing and design process is actually a hindrance. To address these issues, there are three features that should be developed to help improve the user experience when editing and viewing Web pages that include data.

Specifically, it would be desirable to not update the HTML document using the XSLT transformation for each letter or other input made by the user, since the delay for carrying out the update makes the system seem too slow to respond or sluggish. Still, it would be desirable to show the change made by the user in a cell or field of the data being edited—but not immediately promulgate the change to all corresponding cells of the data. Further, it would be desirable to enable a user to cancel a transformation or update of the data that is taking longer than the user is willing to wait, and the data state that is displayed after the cancellation should be the same as before the user initiated a change to all of the data. Finally, it would be desirable to provide modified preview form views of the data that are not strictly WYSIWYG. In some cases, the user may not need to view all of the data or may want to control how templates are affecting the display of the data.

SUMMARY

In consideration of the preceding discussion, a novel method has been developed for facilitating efficient interaction by a user modifying an appearance of data that have been inserted into the Web page, when the data are displayed in a Data View. The method includes the step of tracking any change entered by the user that affects the appearance of the data shown in the Data View. Each such change that is entered since one or more previous changes were promulgated to all of the data is included in a set of one or more pending changes. To avoid the inefficiency incurred by updating all of the data immediately after each change is made by the user, the method delays for a predefined period of time after a last pending change was made by the user, before enabling the set of one or more pending changes to be promulgated to all of the data that are affected thereby. Only after the predefined period of time has elapsed without the user entering a further pending change, is the set of one or more pending changes made to all of the data that are affected. This approach thus provides a much better user experience, since all of the data are updated only after the user has stopped interacting with the data for the predefined period of time. However, where the type of change being made permits, the user is enabled to see the change being made by the user in at least one row of the data. Examples of the kinds of changes that can be treated in this manner are entry of text, backspace, deletion, movements of entities, edits of tables (e.g., adding a label or changing the type of data displayed in a field), and resizing pictures, tables, other objects, or even the Data View.

Another aspect of this novel approach provides for displaying an option to enable the user to cancel all of the one or more pending changes to the data. In response to the user selecting the option to cancel, any of the one or more pending changes that were applied to the data are undone, so that the appearance of the data is made the same as before the promulgation of the one or more pending changes began.

Accordingly, in another aspect of the approach, there is a default Data View in which the data are displayed the same as when the Web page is viewed in a browser. A plurality of user selectable options are provided for modifying a preview form in which the data will be displayed in the Data View as an alternative to a default Data View. These alternative options enable a user to more effectively view and edit an appearance of the data. In response to the user selecting one of the plurality of user selectable options as an alternative to the default Data View, the method modifies the preview form in which the data are displayed in the Data View. For example, the user can view sample data instead of actual data. The user may want to select this option if the actual data only sparsely fill-in the fields within the data. In other cases, to expedite the editing of the data, the user may only want to see a select number of the total number of rows of data in the Data View. Or, a user may want to avoid the effect of a filter that would normally be applied to the data, while working with the data in the Data View, or may want to modify a specific template that may be applied to the data, to change the way in which the template affects the appearance of the preview form in the Data View. By using the alternative options for the preview form in the Data View, the user is able to better control the display of the data and can improve the efficiency with which the data are rendered for display.

This Summary has been provided to introduce a few concepts in a simplified form that are further described in detail below in the Description. However, this Summary is not intended to identify key or essential features of the claimed subject matter, nor is it intended to be used as an aid in determining the scope of the claimed subject matter.

DRAWINGS

Various aspects and attendant advantages of one or more exemplary embodiments and modifications thereto will become more readily appreciated as the same becomes better understood by reference to the following detailed description, when taken in conjunction with the accompanying drawings, wherein.

DESCRIPTION

Figures and Disclosed Embodiments Are Not Limiting

Exemplary embodiments are illustrated in referenced Figures of the drawings. It is intended that the embodiments and Figures disclosed herein are to be considered illustrative rather than restrictive or limiting on the scope of this disclosure.

Exemplary Operating Environment

Figure 1:
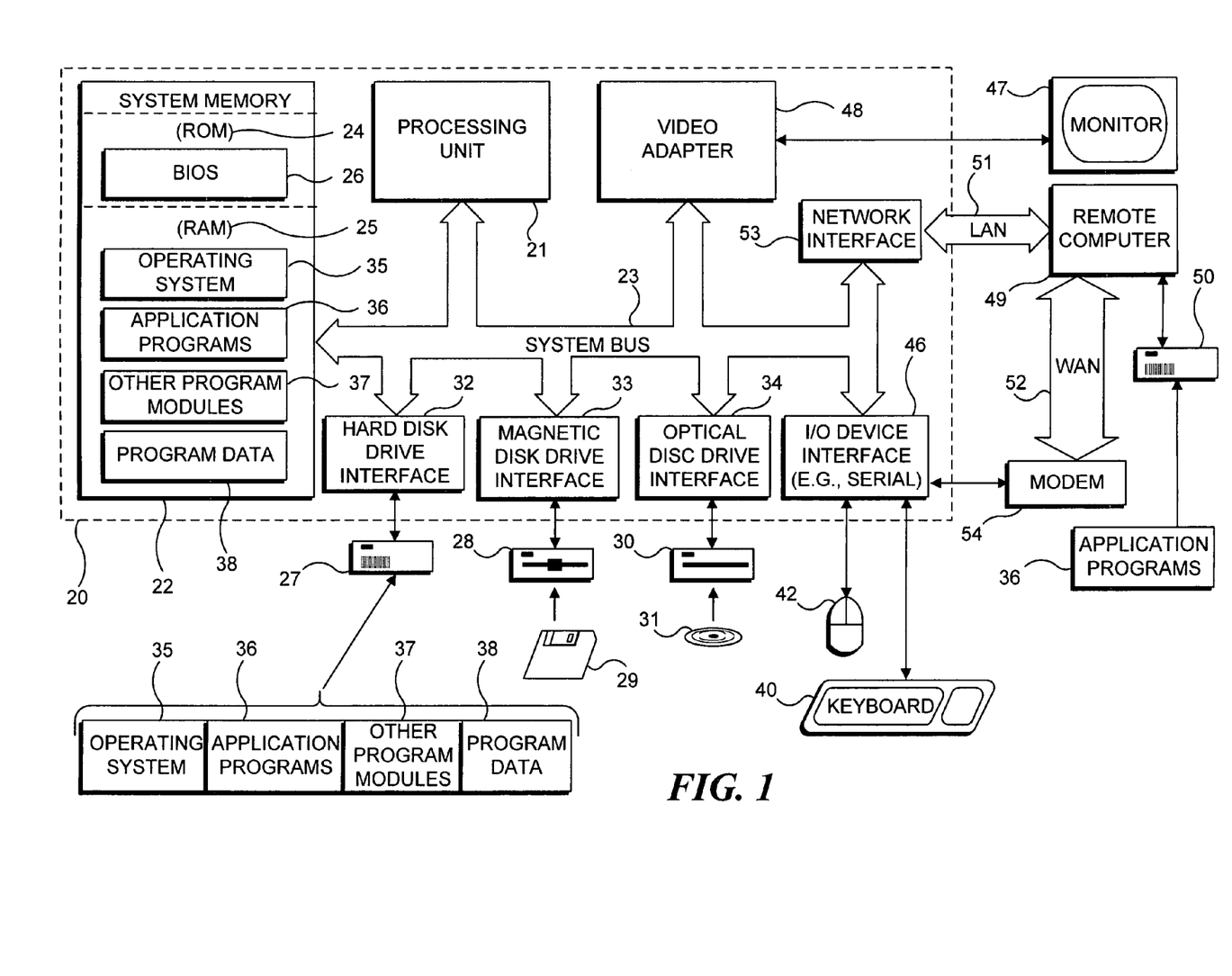
FIG. 1 is a block diagram of an exemplary general purpose computing device in the form of a conventional personal computer (PC), for implementing the present invention.

FIG. 1 and the following discussion are intended to provide a brief, general description of a suitable computing environment in which the present invention may be implemented. The invention may be practiced on a single computing device, but can also be practiced on a client computing device coupled in communication with a server and/or one or more other remote computing devices over a communication network. Both the client computing device and the server will typically each include the functional components shown in FIG. 1. Although not required, the present invention will be described in the general context of computer executable instructions, such as program modules that are executed by a PC. Generally, program modules include application programs, such as computer simulations, routines, objects, components, functions, data structures, etc. that perform particular tasks or implement particular abstract data types. Also, those skilled in the art will appreciate that this invention may be practiced with other computer system configurations, particularly in distributed computing environments, where tasks are performed by remote processing devices that are linked through a communications network. In a distributed computing environment, program modules may be located in either or both local and remote memory storage devices.

With reference to FIG. 1, an exemplary system for implementing the present invention includes a general purpose computing device in the form of a conventional PC 20, which is provided with a processing unit 21, a system memory 22, and a system bus 23. The system bus couples various system components, including the system memory, to processing unit 21 and may be any of several types of bus structures, including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within the PC 20, such as during start up, is stored in ROM 24. PC 20 further includes a hard disk drive 27 for reading from and writing to a hard disk (not shown) and may include a magnetic disk drive 28 for reading from or writing to a removable magnetic disk 29, and an optical disc drive 30 for reading from or writing to a removable optical disc 31, such as a CD-ROM, digital video disk (DVD), or other optical media. Hard disk drive 27, magnetic disk drive 28, and optical disc drive 30 are connected to system bus 23 by a hard disk drive interface 32, a magnetic disk drive interface 33, and an optical disk drive interface 34, respectively. The drives and their associated computer readable media provide nonvolatile storage of computer readable machine instructions, data structures, program modules, and other data for PC 20. Although the exemplary environment described herein includes a hard disk, removable magnetic disk 29, and removable optical disc 31, it will be appreciated by those skilled in the art that other types of computer readable media, which can store data that are accessible by a computer, such as magnetic cassettes, flash memory cards, DVDs, Bernoulli cartridges, RAMs, ROMs, and the like, may also be used in the exemplary computing environment.

A number of program modules may be stored on the hard disk, magnetic disk 29, optical disc 31, ROM 24 or RAM 25, including an operating system 35, one or more application programs 36, other program modules 37, and program data 38. A user may enter commands and information into PC 20 through input devices such as a keyboard 40 and a pointing device 42. Pointing device 42 may include a mouse, stylus, wireless remote control, or other pointer. Other input devices (not shown) may include a joystick, game pad, wheel, pedal, microphone, satellite dish, scanner, digital camera, digital video recorder, or the like. These and other input/output (I/O) devices are often connected to processing unit 21 through an I/O interface 46 that is coupled to the system bus 23. The term I/O interface is intended to encompass each interface specifically used for a serial port, a parallel port, a game port, a keyboard port, and/or a universal serial bus (USB). A monitor 47 or other type of display device is also connected to system bus 23 via an appropriate interface, such as a video adapter 48, and is usable to display application programs, Web pages, a simulated environment, and/or other information. In addition to the monitor, PCs are often coupled to other peripheral output devices (not shown), such as speakers (through a sound card or other audio interface (not shown)), and printers.

As indicated above, the invention may be practiced on a single computing device; however, PC 20 may operate in a networked environment using logical connections to one or more remote computers, such as a remote computer 49. Remote computer 49 may be another PC, a server (which is typically generally configured much like PC 20), a router, a network PC, a peer device, or a satellite or other common network node, and typically includes many or all of the elements described above in connection with PC 20, although only an external memory storage device 50 has been illustrated in FIG. 1. The logical connections depicted in FIG. 1 include a local area network (LAN) 51 and a wide area network (WAN) 52. Such networking environments are common in offices, enterprise-wide computer networks, intranets, and the Internet.

When used in a LAN networking environment, PC 20 is connected to LAN 51 through a network interface or adapter 53. When used in a WAN networking environment, PC 20 typically includes a modem 54, or other means such as a cable modem, Digital Subscriber Line (DSL) interface, or an Integrated Service Digital Network (ISDN) interface, for establishing communications over WAN 52. One type of WAN commonly used for communication is the Internet. Modem 54, which may be internal or external, is connected to the system bus 23 or coupled to the bus via I/O device interface 46, i.e., through a serial port. In a networked environment, program modules depicted relative to PC 20, or portions thereof, may be stored in the remote memory storage device. It will be appreciated that the network connections shown are exemplary and other means of establishing a communications link between the computers may be used, such as wireless communication and wide band network links.

Overview of Data View Feature

Although the Data View feature was initially developed for use within a software program intended for the creation, editing, and management of Web sites, it is generally also applicable to other applications in which a user wants to modify an appearance of data that have been inserted into a Web page, and wants to see how the data as modified will appear when the Web page is opened within a browser window. As explained above, displaying the changes made by a user to data comprising several hundred or even thousands of records is sufficiently computationally intensive, that the editing task can be very inefficient if all of the data are changed immediately after each interactive input by the user occurs. The present novel approach was developed to make this task much more efficient and includes three related components that substantially improve the experience for a user compared to the conventional approach.

The normal intention of the Data View is to provide a WYSIWYG experience to the user when viewing a Web page in which data have been inserted. To facilitate such a real view while enabling the user to make changes to the data on a Web page, the XSLT code for the Web page must be modified to reflect the changes made by the user and the modified XSLT code must then be employed to produce the HTML code that is used by the browser program to display the Web page. In this particular application, the Web page creation and editing software automatically generates corresponding changes to the XSLT used to convert XML data to HTML, for display by the Web browser program. The editing of data in the Data View has previously been frustrating to users because of the inefficiencies that occur when each change was promulgated to the data by applying the modified XSLT to produce the HTML needed to display the change for all of the data in a Web page.

If each letter or number typed by a user as input to change the Data View is immediately interpreted and employed to change the appearance of the data displayed to the user, the user will experience an unacceptable sluggishness that delays further input needed for a desired change. To address this issue, the present approach only displays the change made by a user in field or a single line of the data immediately after the change is made, but does not propagate the change to all of the data until after the user has paused in interactively providing input to change the data, for at least a predefined period of time. Thus, the data are completely updated only during lapses between successive sets of changes made by the user. As a result, a user will not perceive that the input of changes to the appearance of the data in the Data View is being unduly delayed.

Further, if the time required to update all the data seems to be excessive to a user, the present novel approach also enables the user to cancel the update before it is completed, causing the appearance of the data in the Data View to be restored to the state just before the program began to update the data for the last one or more changes by the user. This ability to cancel an update to the entire set of data gives the user greater flexibility and control when making changes to the appearance of a large set of data records. It can also be useful if the update of the data appears to be hung.

A third aspect of this novel approach enables a user to have greater flexibility in controlling the preview form in which data are displayed in the Data View. Several different options other than the default are available to a user to modify the preview format that controls how the data are displayed in the Data View, as explained below.

User Options for Control of the Data View

Figure 2:
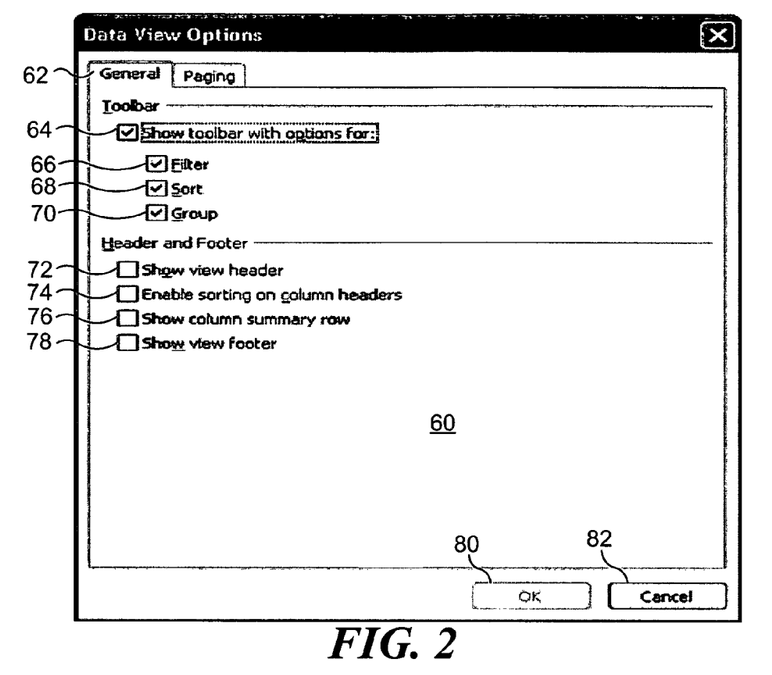
FIGS. 2 and 3 illustrate exemplary dialog boxes in which a user can selectively set various options for a Data View of data on a Web page, in accord with the present development.
Figure 3:
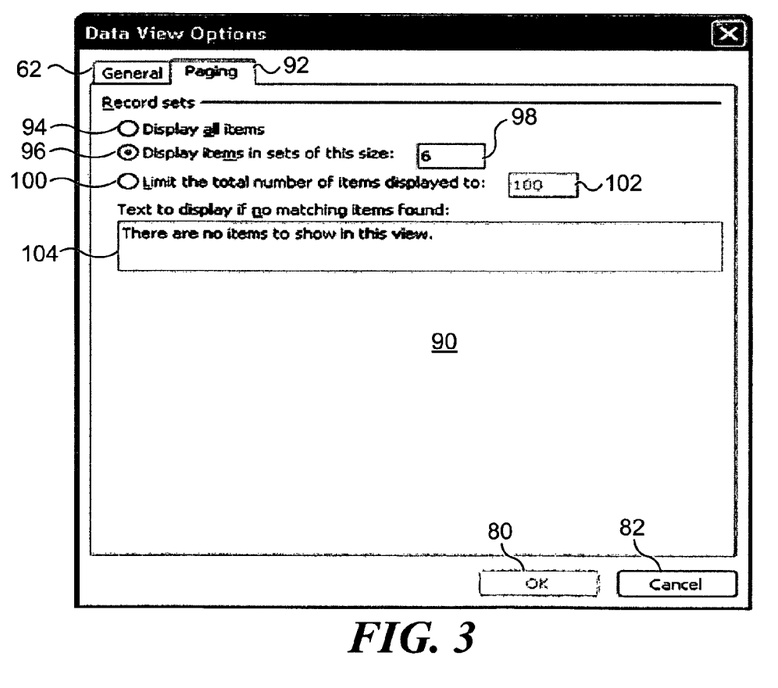

As shown in FIGS. 2 and 3, an exemplary embodiment for providing the Data View functionality enables the user to set different options for controlling the operation of the Data View. A dialog box 60, shown in FIG. 2, includes a general tab 62 with user selectable checkboxes relating to the Data View toolbar, and to the header and footer. Under the toolbar options, dialog box 60 includes a check box 64 that, if selected, enables the user to show the toolbar with one or more other selected options. If a check box 66 is chosen, options for a filter are included on the toolbar. Checkboxes 68 and 70 can be respectively selected to include options for sort, and for group on the toolbar.

Under the header and footer options, dialog box 60 includes a checkbox 72 for showing the view header, a checkbox 74 for enabling sorting on column headers, a checkbox 76 for showing a column summary row, and a checkbox 78 for showing the view footer option. Control buttons 80 and 82 respectively enable a user to select OK, or cancel, in regard to the options selected in dialog box 60.

A dialog box 90 is shown in FIG. 3, illustrating the options available on a paging tab 92. These options include a radio button 94, which can be selected to display all items of the data, a radio button 96, which can be selected to display items in sets, with a size entered in a text input box 98, and a radio button 100, which can be selected to limit the total number of items displayed to a numeric value that is typed by a user in a text input box 102. A text input box 104 enables the user to selectively input a text phrase that will be displayed if no matching items of data are found for display on a Web page.

Exemplary Data View and Dialog Box for Selecting Preview Format Options

Figure 4:
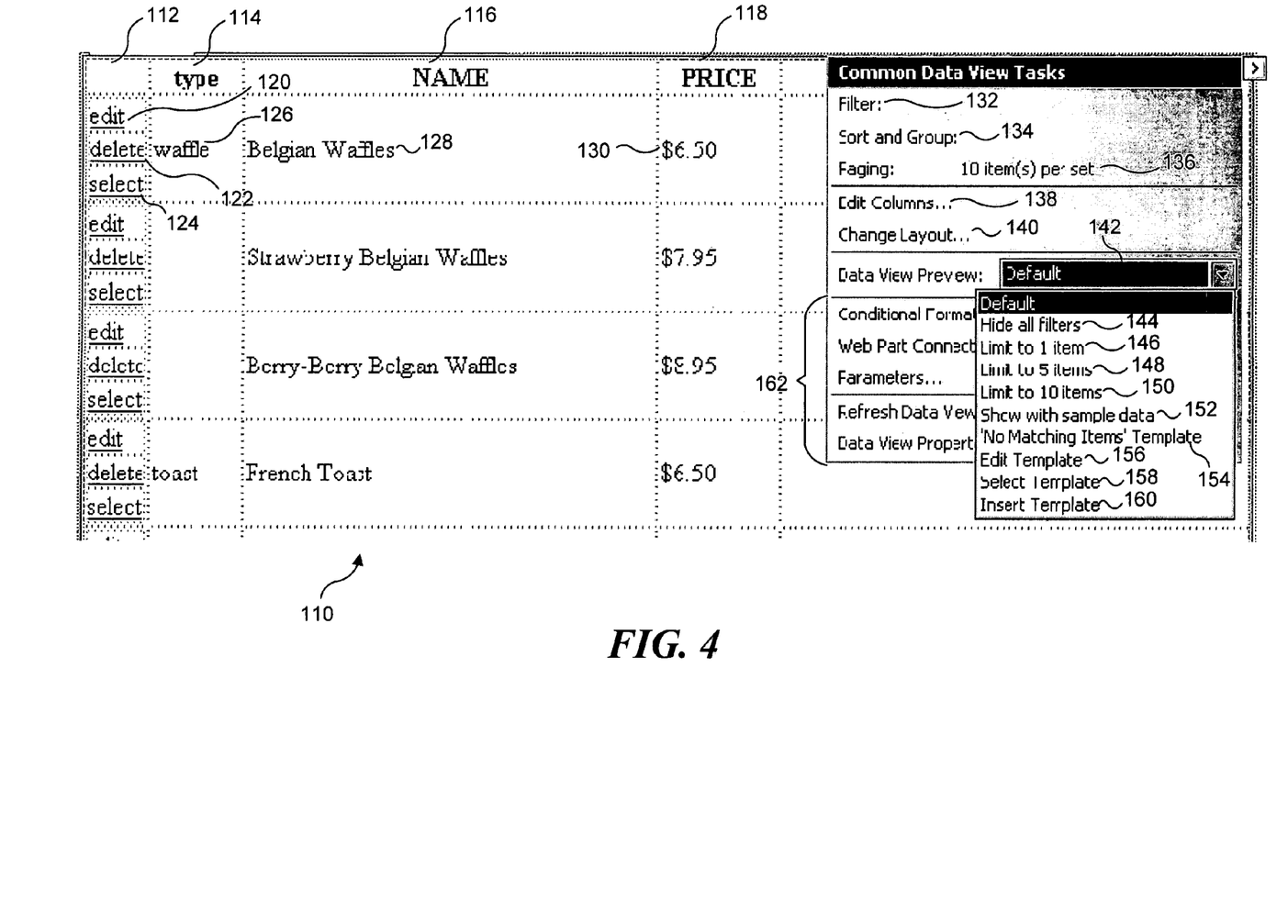
FIG. 4 is an exemplary Data View showing a drop-down list box from which a user can select a different preview form for the Data View.

An exemplary simple Data View 110 is illustrated in FIG. 4. This Figure also shows a plurality of different Data View tasks for which a user can selectively set options. For this example, Data View 110 includes a controls column 112 (no label), a column 114 labeled "type," a column 116 labeled "NAME," and a column 118 labeled "PRICE." For each row of data, controls column 112 includes an edit option 120, a delete option 122, and a select option 124. Under column 114, the first row of data includes a word 126 that identifies the type of as "waffle." Under column 116, the name for the type of waffles listed at reference number 128 in the first row is "Belgian Waffles." The price included at reference number 130 in the first row of data is "$6.50."

Common Data View tasks listed in the dialog box on the right side of FIG. 4 for this example include an option for selecting a filter 132, a sort and group option 134, and an option 136 for indicating the number of items per sets, i.e., for pagination purposes. A user can also selectively enable editing of columns with an option 138, and change the layout of the Data View by selecting an option 140. More importantly, a drop-down list box 142 provides a listing of the different preview formats from which a user can select. The default format that is illustrated will normally display the data in a WYSIWYG view, unless one of the alternatives is selected. In the default format, the data inserted into the Web page will appear in the Data View just as the data will be displayed within a window of a browser program.

Alternatively, when displaying the data in the Data View, a user can alternatively select from among a plurality of options to alter the preview form in Data View. The alternatives include an option 144, which can be selected to hide all filters that would normally be applied when the data are displayed in a window of a browser program. A user may want to select this option, for example, if a filter that is applied would otherwise prevent the data from being displayed, based upon predefined conditions. Options 146, 148, and 150, enable the user to selectively limit the amount of data displayed in the Data View to one item, five items, or ten items. The term "item" can be considered equivalent to rows of data. This option can be selected when the user only wants to view a portion of the data to which changes made by the user will be applied in the Data View. Displaying only a portion of the data can clearly reduce the time required to update the Data View as changes are made by the user.

In some cases, the actual data will be relatively incomplete so that entries for many of the fields in the rows of data are missing. In this case, by selecting an option 152, a user may choose to view sample data instead of the actual data in the Data View. The fields of the sample data will be automatically selected to correspond to the same type as in the actual data. For example, the values for sample data in successive rows under the column heading "Type" might be filled with the terms: "Type1," "Type2," "Type3," etc.

Four other options for displaying data in the Data View enable the user to modify a template that may be applied to affect the display of data in the Data View. Thus, an option 154 enables the user to selectively modify the text that is displayed in the Data View, in the event that there are no matching items in the data to be displayed. An option 156 enables a user to modify the edit template, which is employed when a user selects edit control 120. Similarly, an option 158 enables modification of the template employed when a user chooses select control 124. Choosing an option 160 enables a user to insert a template that will be employed in displaying the data within the Data View. Still other options 162 can be selected to apply other variations to the Data View.

Examples of Modifying Templates Applied to the Data View

Figure 5A:
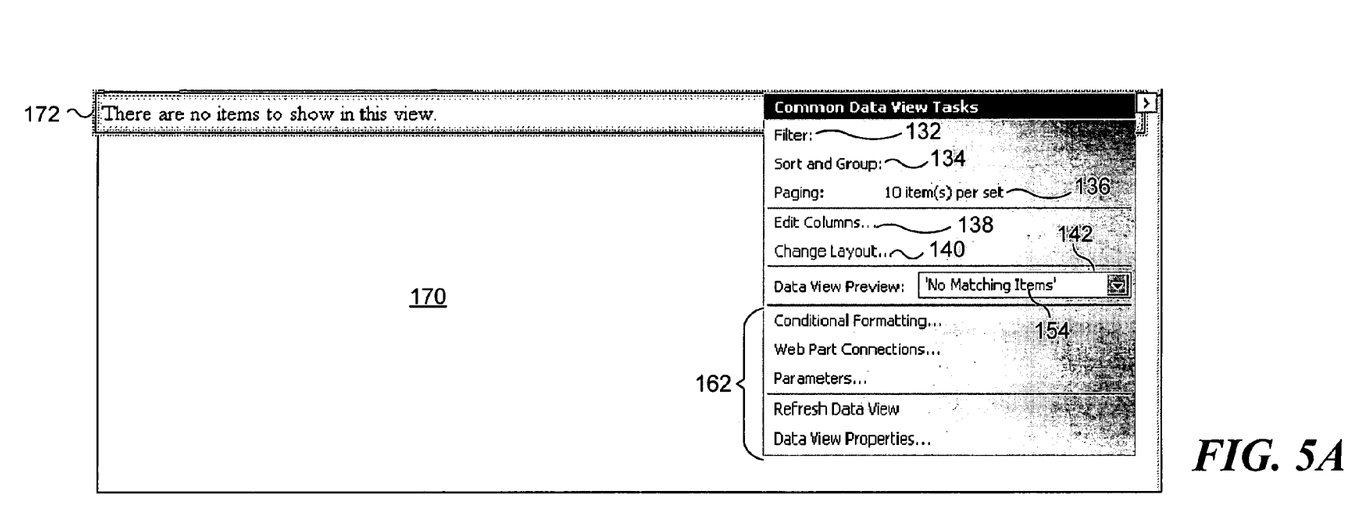
FIGS. 5A and 5B respectively illustrate a default for a template identified as "No Matching Items," and the result of modifying the template to display a different text message when the template is employed in the Data View.
Figure 5B:
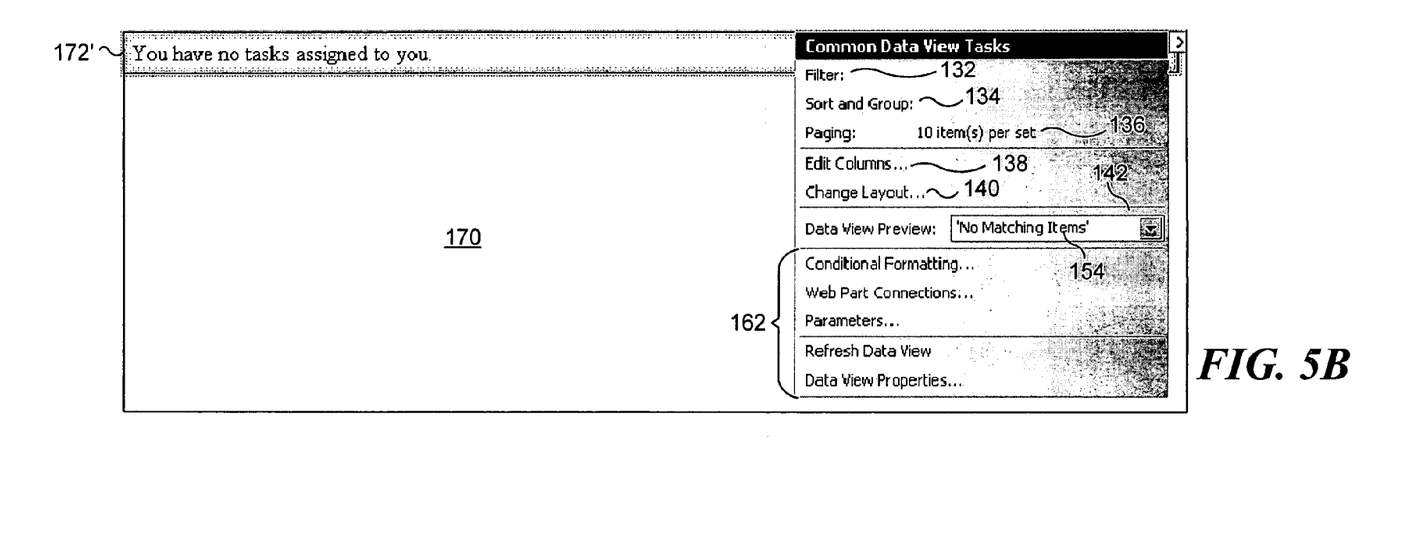

FIGS. 5A and 5B illustrate the effect of changing the phrase that is displayed in the Data View in regard to option 154, which provides for modification of the template employed if no matching items of data are found for display in the Data View. A Data View 170 shown in FIG. 5A illustrates a default phrase 172 that is displayed when the conditions for displaying data in the Data View result in no matching items being found for display, which cause this template to be employed. Default phrase 172 for this template reads: "There are no items to show in this view." In FIG. 5B, Data View 170 shows a phrase 172', which is displayed under the same conditions, but the phrase has been modified by the user after selecting option 154 to read: "You have no task assigned to you."

Figure 6A:
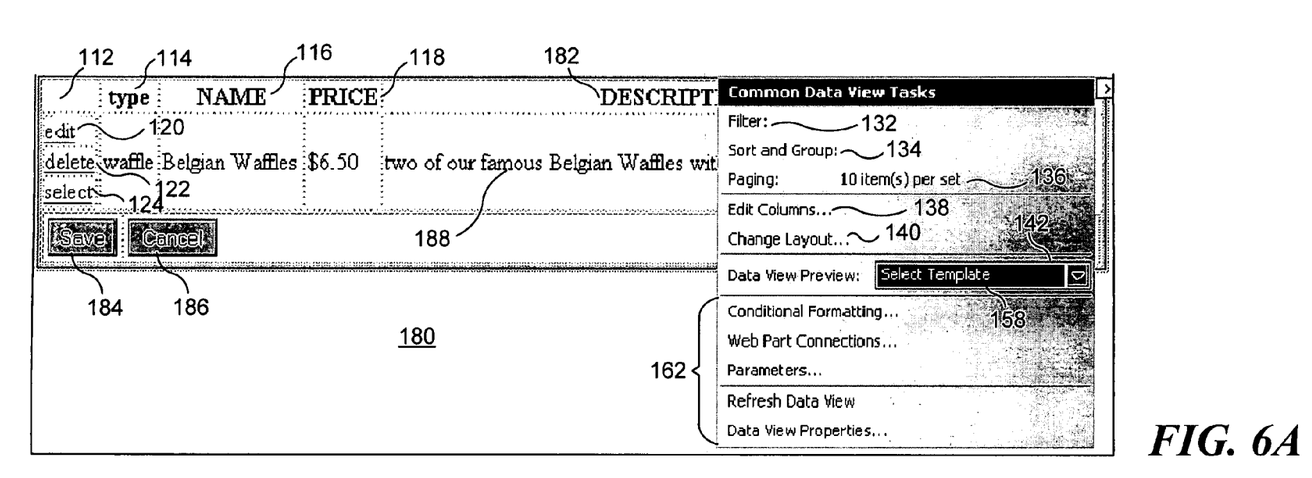
FIGS. 6A and 6B respectively illustrate a default for a template used for the "select" option, and the result of modifying the template to show bold font text when the "select" option is activated in the Data View.
Figure 6B:
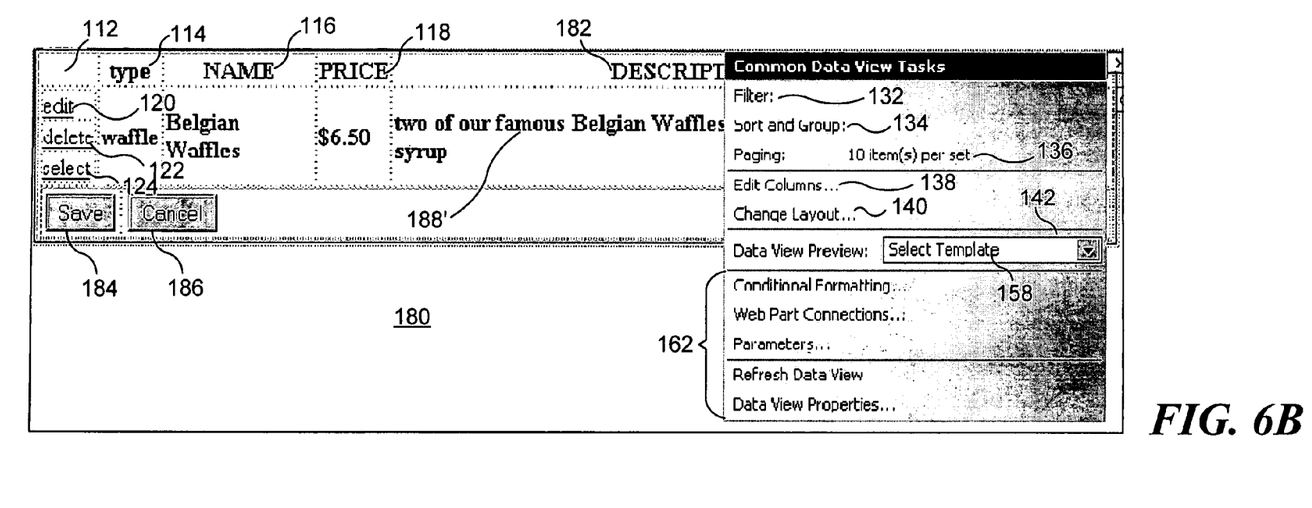

Similarly, FIGS. 6A and 6B respectively illustrate a Data View 180 in which the default select template is applied (FIG. 6A) and a modified select template is applied (FIG. 6B). In FIG. 6B, the user has chosen option 158 and has modified the select template as follows. Before being modified by the user, when a user chose select control option 124, the selected line was displayed with the default font, as illustrated by a line 188 in FIG. 6A. In contrast, by choosing option 158 to modify the select template, the user has now changed the font as indicated by line 188', so that the selected line is displayed in bold font, instead of the default non-bold font. A user can select either a control 184 to save changes made to the format for displaying the data, or a control 186 to cancel the changes made. (Note that in addition to displaying the selected line in bold font, the modified select template changes the number of lines of text required for the display of one record of data, since the bold font characters require more space.) These Figures also display part of a column 182 labeled "DESCRIPTION," (although only part of this label is visible).

As noted above, the present novel approach does not propagate a change made to the appearance of the data in the Data View to all of the data until there is a pause in the interaction with the data by the user. For example, if the user stops interacting with the data for three seconds, a set of changes made by the user to the appearance of the data since the last update was propagated to all of the data in the Data View will then be made. The user immediately sees any change made within a field or to a single line of data, but the change is not propagated to all of the other lines of data until the user interaction is interrupted briefly, for example, while the user considers any further changes to be made. This approach to update the data only when there is an interruption in the user interaction can be reliably implemented at the end of a sequence of user interactions when it is clear how the user changes will appear. For example, if the user is typing a label as input, or resizing an object in the Data View such as an image, or even resizing the Data View itself, as soon as the user pauses in the interaction with the data for the predetermined time interval, the changes will be propagated throughout the entire data. Previously, a substantial delay could be incurred as the user resized an object (or the Data View), since the change would be propagated to all of the data, for each pixel of change made by the user. It will be appreciated that the interruption required for each pixel change in size made by dragging a side or corner of an object rapidly became frustrating to a user before the present approach. In the present approach, the user can see the change being made immediately in the screen where the change occurs, but the change to all of the data is delayed until the user pauses in typing input, or in resizing an object.

Figure 7:
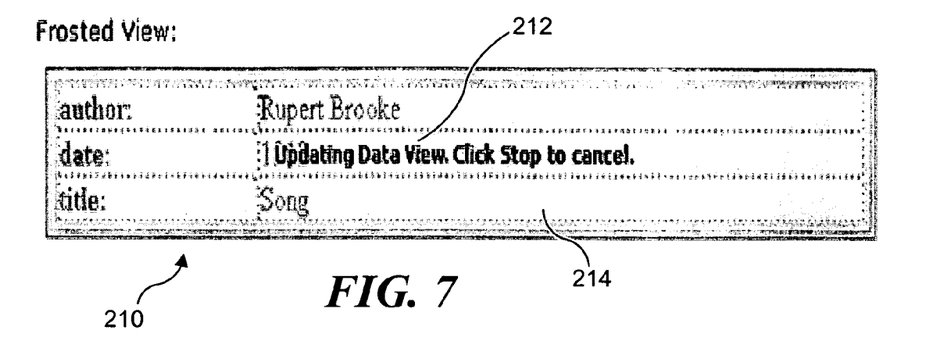
FIG. 7 illustrates the frosting of the Data View and an exemplary message displayed while the data are being updated to reflect one or more changes by a user.

FIG. 7 includes an example 210 illustrating how the Data View changes whenever an update is made to all the data to reflect a set of one or more changes made by the user, after the user pauses in interacting with the data for the predetermined period of time. A message 212 is displayed during the update of the data, and actual data 214 in the Data View (i.e., in the background behind message 212) takes on a "frosted" appearance, as indicated in FIG. 7. Message 212 indicates that the user has the option to selectively click on stop to cancel the update of the data. This provision for cancelling an update of the data in the Data View is explained in greater detail below.

Diagram of Data View Update Process

Figure 8:
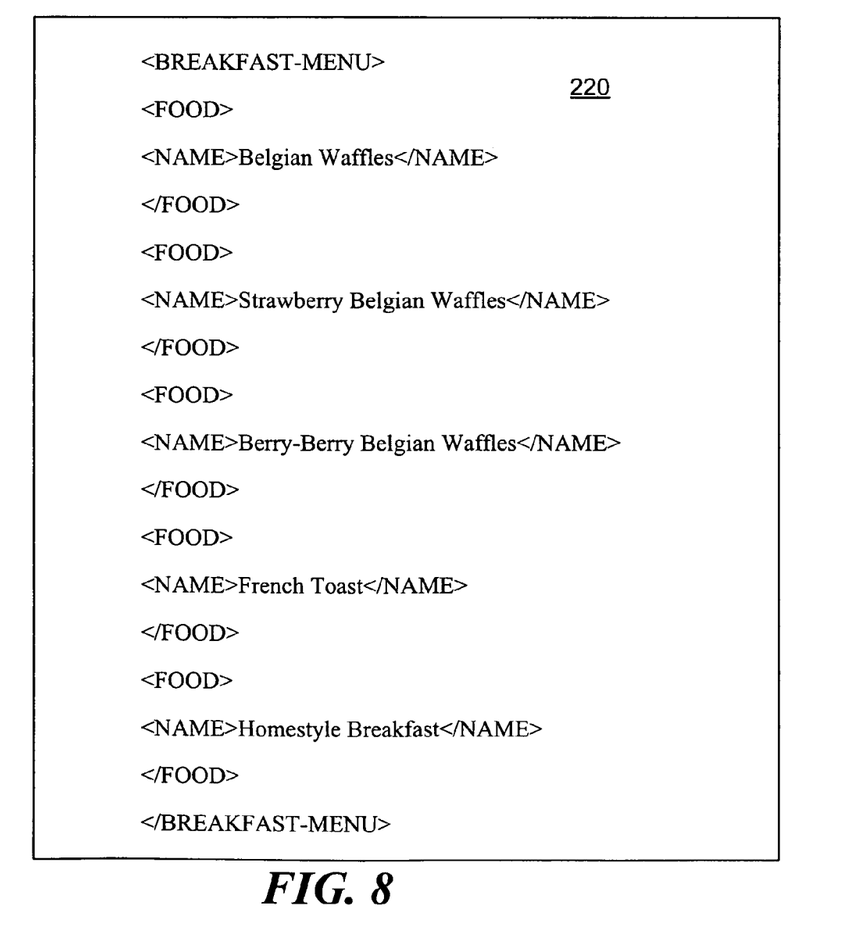
FIG. 8 is exemplary XML data for insertion into a Web page.
Figure 9:
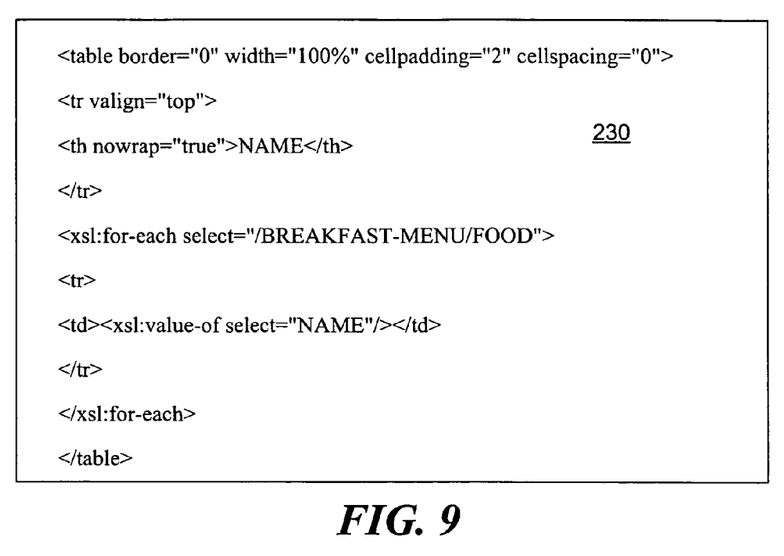
FIG. 9 is an exemplary XSLT listing (with inline HTML) that can be used to create a Data View presentation form for the XML of FIG. 8.
Figure 10:
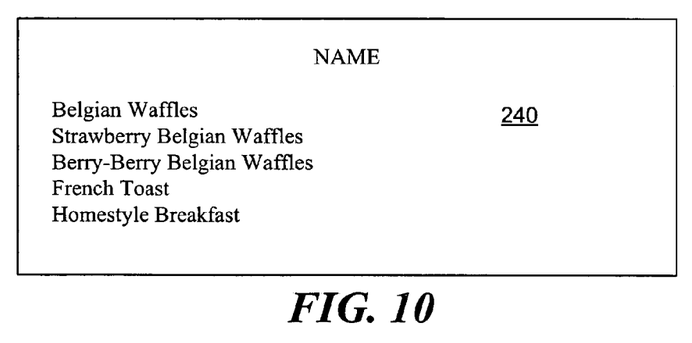
FIG. 10 illustrates the output in a Web page resulting from converting the XSLT to the XML/HTML that are displayed by a browser program.
Figure 11:
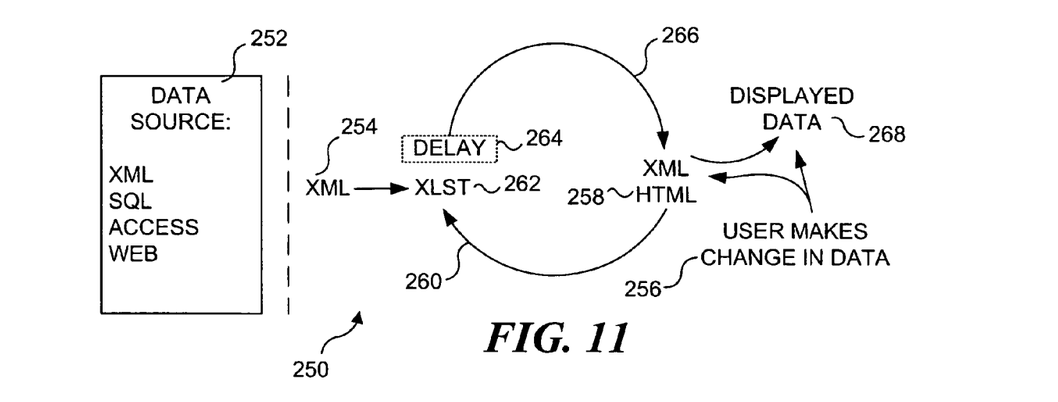
FIG. 11 is a schematic diagram illustrating the options for a source of the data inserted into a Web page and the two-way roundtrip that is involved when a user makes a change that must be applied to update the Data View for data in a Web page.

A schematic diagram 250 in FIG. 11 illustrates further details of the update process applied to propagate a change in the appearance of the data made by a user in the field of one row to all of the data in the Data View. The data being viewed in the Data View are typically inserted into a Web page from a data source 252 and can comprise XML, or data from database programs, e.g., Microsoft Corporation's SQL Server™, or ACCESS™ software programs, or data from a Web data source. The data, which are preferably imported as XML 254, are formatted for display within a Web page using an XSLT transformation engine 262. An example of such an engine is included in the Microsoft XML components shipped with Internet Explorer™ and Windows XP™. A simple example, showing XML data 220, is provided in FIG. 8. An exemplary XSLT (with inline HTML) listing 230 that is written for converting XML data 220 into HTML for use by a browser program in displaying the data in a Web page is shown in FIG. 9, and a resulting Data View 240 for the HTML is illustrated in FIG. 10.

When a user makes a change in the data within the data display, as indicated at 256 in FIG. 11, the change made by the user is shown within the field or line where the change(s) are made, or at least some portion of the screen in which the data are displayed, so that the user has immediate feedback of the change(s). This step also initiates a two-way round-trip to change all of the data in a corresponding manner. Since the HTML that are displayed by a browser program are produced based upon XSLT code 262, the change made by the user has to be input to modify the XSLT code, as indicated by an arrow 260. Each change made by the user since the last update is input to modify the XSLT code, but the update of all of the data using the modified XSLT to reflect those changes, is delayed, as indicated by a block 264. The update of all of the data occurs only after the user has stopped interacting with the data for the predetermined time interval. An arrow 266 indicates that the XSLT code modified to reflect the change(s) by the user is then used to convert the XML to HTML 258 so that all of the data viewed by the user in the Data View now reflect those changes. A display of the data as thus changed by the user is presented in Data View 268 so that the user can perceive how the data will appear within a window of a browser program. However, as noted above, the user can selectively modify the appearance of the data in the preview form for the Data View by selecting one of the available options in drop-down list box 142 of FIG. 4.

Logical Steps for Implementing Changes to Data in Data View

Figure 12:
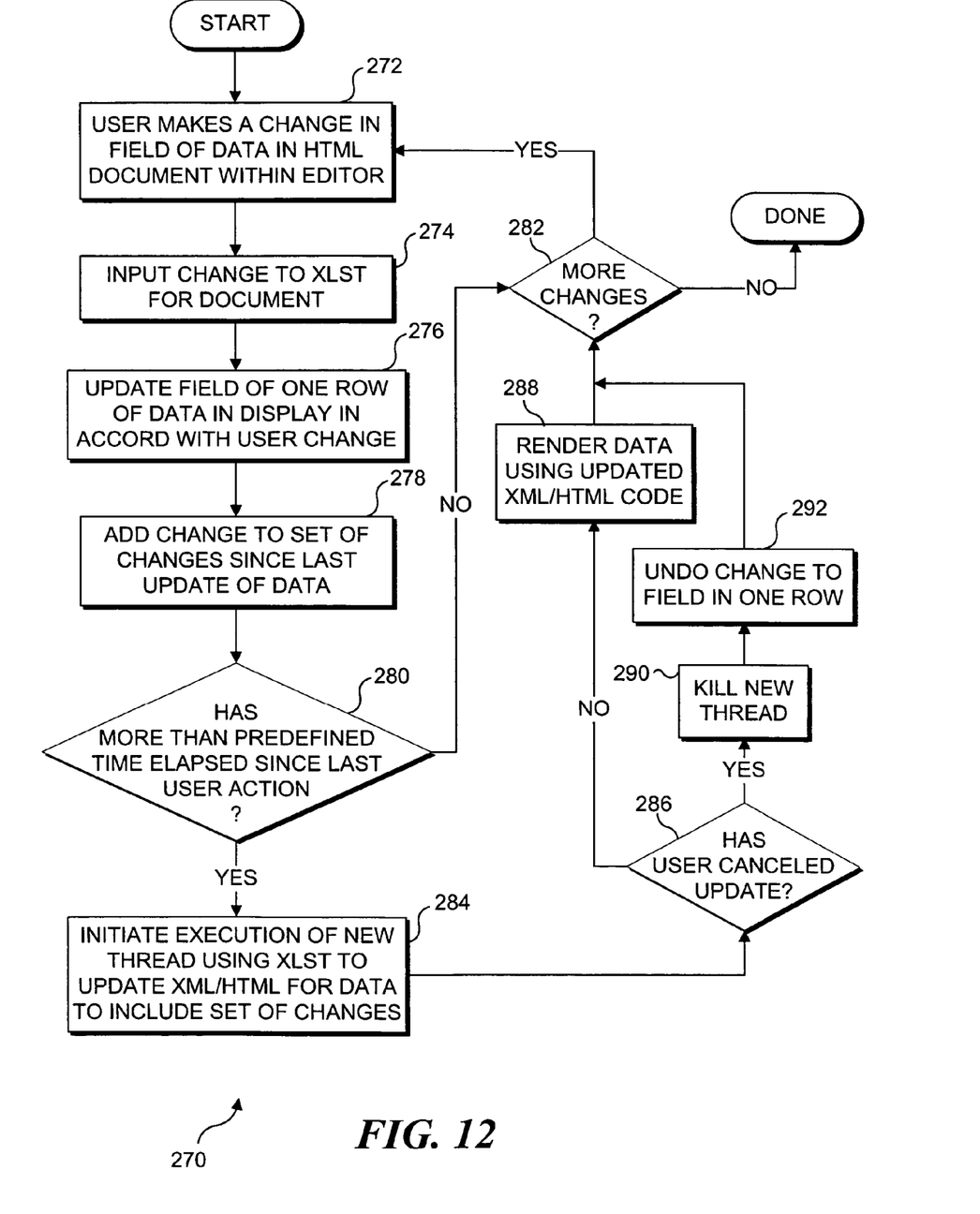
FIG. 12 is a flowchart illustrating the logical steps for handling changes to data in a Data View, so as to update all of the data seen in the Data View.

FIG. 12 includes a flowchart 270 illustrating the logical steps that are implemented for carrying out changes to the data in the Data View by a user, in accord with the present novel approach. A step 272 indicates that a user makes a change in a field of the data within the HTML document on which the user is working, e.g., within a Web page editor program. The kinds of changes that can be made relate to the appearance of the data as displayed within a window of a browser program. Although the actual values of the data cannot be changed in the Data View, the user can add labels, and change or modify other attributes that affect the appearance of the data when thus displayed. For example, as noted above, the choice of fonts, font size, general layout, size of objects, and other appearance related parameters and conditions for the data can be altered by the user, while working in the Data View.

In a step 274, the change made by the user is input to the XSLT code employed for converting the XML to HTML. This approach also revises or updates the appearance of data being displayed on the screen (at least a field or line of the data) in a step 276, so that the user is immediately provided visual feedback for the change just made. At a step 278, the change made by the user is added to a set of one or more changes made since the last update of all the data occurred. A decision step 280 determines if a predefined time interval has elapsed since the last user interaction with the data. If not, a decision step 282 determines if any more changes will be made by the user. If the user selectively terminates interaction with the data in the Data View, the program logic is done. Otherwise, logic loops back to step 272.

If the predefined time period has elapsed since the last user action, a step 284 provides for initiating execution of a new thread using XSLT to update the XML/HTML used for displaying the data in a window of a browser program, so that the data appearance reflects the one or more changes made by the user since the last update of all the data. A decision step 286 determines if the user has chosen to cancel the update before it is complete. If not, a step 288 renders the data using the updated XML/HTML code, so that the updated data are displayed to the user in the Data View. The logic then continues with decision step 282.

An affirmative response to decision step 286 leads to a step 290 in which the program "kills" the new thread being used for updating the data. The user can cancel the update in this manner by selecting a stop control. Step 290 then provides for restoring the appearance of all the data to its state prior to the start of the update process. A stack is used to track the changes being implemented, to enable the update process to be undone. In addition, step 292 provides for undoing the change (s) made to the field or other portion of the data initially displayed to the user to provide immediate feedback for the change(s). The logic then continues with decision step 282.

Figure 13:
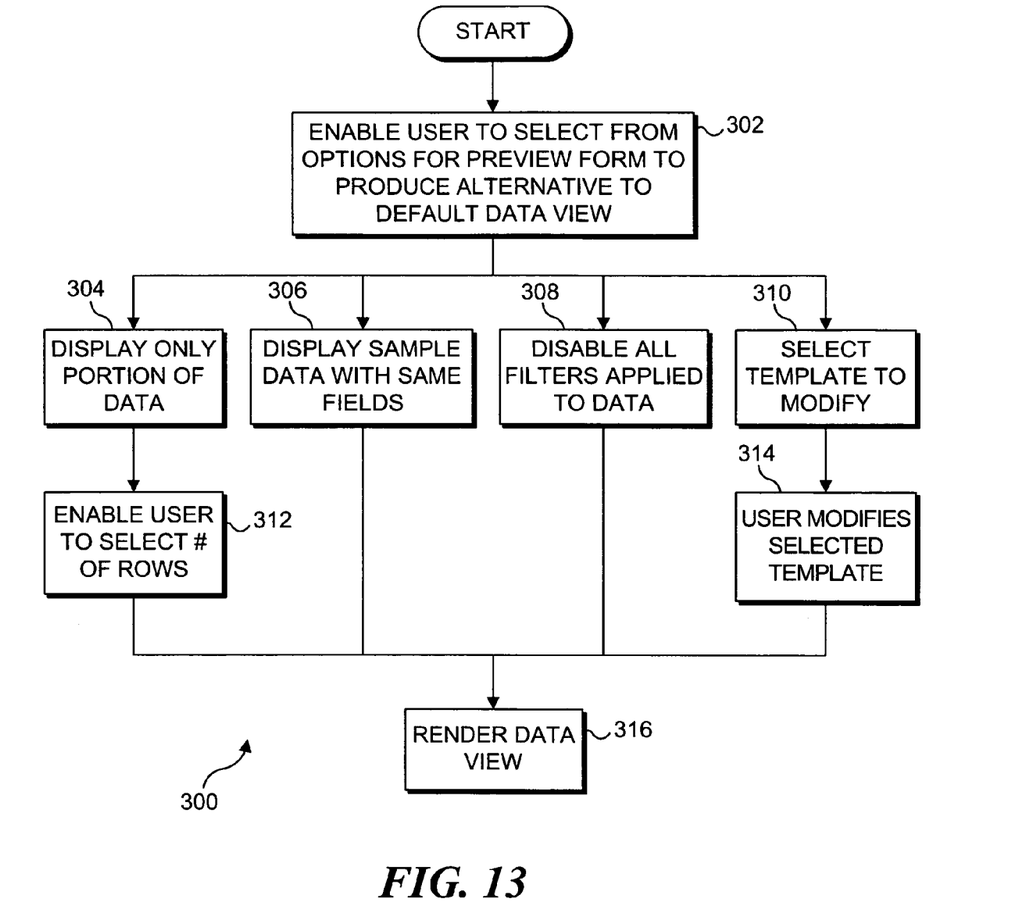
FIG. 13 is a flowchart illustrating the logical steps for enabling a user to select alternative preview forms rather a standard default, for use in displaying the data in the Data View.

In FIG. 13, a flowchart 300 indicates the logical steps that are carried out to enable a user to select alternative options for controlling the preview form applied to displaying the data in the Data View. A step 302 enables a user to select from the available options for the preview form, as an alternative to the default preview form for the Data View. In this example, there are four alternatives, including steps 304, 306, 308, and 310. Step 304 can be selected by the user to display only a portion of the data. Step 306 can be selected to display sample data having the same types of data fields as the actual data, instead of the actual data. Step 308 can be selected to disable filters that would normally be applied to the data when displayed in the Data View. And, step 310 can be chosen for selecting a template that is to be modified as an alternative to the default preview form. If the user selects step 304, a step 312 enables the user to select the number of rows of data that will be displayed in the Data View. In the example shown above, the user can select one, five, or ten rows of data to be displayed in the Data View.

If a user chose the option of step 310, choosing a template to modify, a step 314 enables the user to modify the selected template as desired. After any of steps 312, 306, 308, or 314, a step 316 renders the Data View, applying any option selected by the user to modify the preview form, which can affect the display of the data in the Data View.

Although the present approach has been described in connection with the preferred form of practicing it and modifications thereto, those of ordinary skill in the art will understand that many other modifications can be made thereto within the scope of the claims that follow. Accordingly, it is not intended that the scope of protection sought for this development in any way be limited by the above description, but instead be determined entirely by reference to the claims that follow.

The invention in which an exclusive right is claimed is defined by the following:

1. A method for facilitating efficient interaction by a user working in a Data View while editing an appearance of data that have been inserted into a Web page, comprising the steps of:
    (a) tracking any change entered by the user that affects the appearance of the data shown in the Data View, each such change that is entered since one or more previous changes were promulgated to all of the data being included in an entire set of one or more pending changes, the entire set of the one or more pending changes including a last pending change made by the user;
    (b) displaying the Data View with a change to an appearance of only some of the data that is to be altered by the set of one or more changes and by at least delaying promulgation of the entire set of the one or more pending changes within the Data View, until a predefined period of time elapses after entry of the last pending change was made by the user, and such that the entire set of the one or more pending changes is not reflected in an appearance of all of the data that is to be altered by the set of one or more pending changes within the Data View until after the predefined period of time elapses after entry of the last pending change;
    (c) after the predefined period of time has elapsed without the user entering a further pending change, promulgating the entire set of one or more pending changes to all of the data that are affected thereby, the step of delaying preventing a change of all of the data from being made immediately after the user has entered the change, to avoid delaying entry of successive changes by the user while each immediately successive change is promulgated to the data; and
    enabling the user to cancel promulgating the set of one or more changes to the data, and restoring the appearance of the data to that before the entire set of one or more changes began to promulgate to the data.

2. The method of claim 1, further comprising the step of enabling the user to insert the data into the Web page from one of:
    (a) an extended markup language (XML) file;
    (b) a database table; and
    (c) a list produced for use in a collaborative environment.

3. The method of claim 1, wherein the change in the appearance of the data in the Data View of the Web page is input to and transformed by an extended markup language stylesheet (XSLT), to modify a hypertext markup language (HTML) definition that controls the appearance of all of the data in the Data View of the Web page.

4. The method of claim 3, further comprising enabling the user to control how the change for the last pending change is displayed within the Data View.

5. The method of claim 4, wherein the last pending change entered by the user is shown within only a single row within the Data View and indicates how HTML for all rows of the data are to be changed when the entire set of the one or more changes is promulgated.

6. The method of claim 4, wherein the last pending change that is depicted comprises one of:
    (a) entry of an alphanumeric character by the user;
    (b) resizing a portion of the data, where the portion of the data can include a table, as well as at least one of a row and a column of a table;
    (c) deletion of a portion of the row;
    (d) entering a backspace; or
    (e) resizing the Data View.

7. The method of claim 1, wherein the predefined period of time is at least one second.

8. The method of claim 1, wherein the predefined period of time is at least three seconds.

9. A method for facilitating efficient interaction by a user working in a Data View while editing an appearance of data that have been inserted into a Web page, comprising the steps of:

(a) enabling a user to enter a change to the data that affects an appearance of the data within the Web page, the change being included in a set of one or more pending changes;

(b) initiating promulgation of the set of one or more pending changes to the data after the user has not interacted with the data for a predefined period of time;

(c) after beginning the promulgation of the one or more pending changes to affect the appearance of the data, displaying an option to enable the user to cancel all of the one or more pending changes to the data; and (d) in response to the user selecting the option to cancel, undoing any of the one or more pending changes that were applied to the data, so that the appearance of the data is the same as before the promulgation of the one or more pending changes began.

10. The method of claim 9, wherein the set of one or more pending changes to the data is implemented with an extended markup language stylesheet transformation (XSLT) to which the set of one or more pending changes are input, further comprising the step of executing the transformation provided by the XSLT in a separate processing thread.

11. The method of claim 10, wherein the step of undoing comprises the step of interrupting the transformation being carried out by the separate processing thread.

12. The method of claim 10, wherein the set of one or more pending changes are implemented by the XSLT using an undo stack, to enable returning the appearance of the data to a state that it had before beginning the promulgation of the set of one or more changes to the data.

13. The method of claim 9, wherein the step of displaying the option comprises the step of displaying a translucent overlay message on the Data View, the translucent overlay message indicating that the Data View is being updated and indicating how the user can selectively cancel updating the Data View.

14. A computer storage medium storing computer-executable instructions which, when executed by a processor of a computing system, implement a method for facilitating efficient interaction by a user working in a Data View while editing an appearance of data that have been inserted into a Web page, and wherein the method includes:

tracking any change entered by the user that affects the appearance of the data shown in the Data View, each such change that is entered since one or more previous changes were promulgated to all of the data being included in an entire set of one or more pending changes, the entire set of the one or more pending changes including a last pending change made by the user;

displaying the Data View with a change to an appearance of only some of the data that is to be altered by the set of one or more changes and by at least delaying promulgation of the entire set of the one or more pending changes within the Data View, until a predefined period of time elapses after entry of the last pending change was made by the user, and such that the entire set of the one or more pending changes is not reflected in an appearance of all of the data that is to be altered by the set of one or more pending changes within the Data View until after the predefined period of time elapses after entry of the last pending change;

after the predefined period of time has elapsed without the user entering a further pending change, promulgating the entire set of one or more pending changes to all of the data that are affected thereby, the step of delaying preventing a change of all of the data from being made immediately after the user has entered the change, to avoid delaying entry of successive changes by the user while each immediately successive change is promulgated to the data; and enabling the user to cancel promulgating the set of one or more changes to the data, and restoring the appearance of the data to that before the entire set of one or more changes began to promulgate to the data.

15. A computing system comprising:

a processor; and a storage medium storing computer-executable instructions which, when executed by the processor, implement a method for facilitating efficient interaction by a user working in a Data View while editing an appearance of data that have been inserted into a Web page, and wherein the method includes:

tracking any change entered by the user that affects the appearance of the data shown in the Data View, each such change that is entered since one or more previous changes were promulgated to all of the data being included in an entire set of one or more pending changes, the entire set of the one or more pending changes including a last pending change made by the user;

displaying the Data View with a change to an appearance of only some of the data that is to be altered by the set of one or more changes and by at least delaying promulgation of the entire set of the one or more pending changes within the Data View, until a predefined period of time elapses after entry of the last pending change was made by the user, and such that the entire set of the one or more pending changes is not reflected in an appearance of all of the data that is to be altered by the set of one or more pending changes within the Data View until after the predefined period of time elapses after entry of the last pending change;

after the predefined period of time has elapsed without the user entering a further pending change, promulgating the entire set of one or more pending changes to all of the data that are affected thereby, the step of delaying preventing a change of all of the data from being made immediately after the user has entered the change, to avoid delaying entry of successive changes by the user while each immediately successive change is promulgated to the data; and enabling the user to cancel promulgating the set of one or more changes to the data, and restoring the appearance of the data to that before the entire set of one or more changes began to promulgate to the data.

16. A computer storage medium storing computer-executable instructions which, when executed by a processor of a computing system, implement a method for facilitating efficient interaction by a user working in a Data View while editing an appearance of data that have been inserted into a Web page, wherein the method includes:

enabling a user to enter a change to the data that affects an appearance of the data within the Web page, the change being included in a set of one or more pending changes;

initiating promulgation of the set of one or more pending changes to the data after the user has not interacted with the data for a predefined period of time;

after beginning the promulgation of the one or more pending changes to affect the appearance of the data, displaying an option to enable the user to cancel all of the one or more pending changes to the data; and in response to the user selecting the option to cancel, undoing any of the one or more pending changes that were applied to the data, so that the appearance of the data is the same as before the promulgation of the one or more pending changes began.

17. A computing system comprising:

a processor; and a storage medium storing computer-executable instructions which, when executed by a processor of a computing system, implement a method for facilitating efficient interaction by a user working in a Data View while editing an appearance of data that have been inserted into a Web page, wherein the method includes:

enabling a user to enter a change to the data that affects an appearance of the data within the Web page, the change being included in a set of one or more pending changes;

initiating promulgation of the set of one or more pending changes to the data after the user has not interacted with the data for a predefined period of time;

after beginning the promulgation of the one or more pending changes to affect the appearance of the data, displaying an option to enable the user to cancel all of the one or more pending changes to the data; and in response to the user selecting the option to cancel, undoing any of the one or more pending changes that were applied to the data, so that the appearance of the data is the same as before the promulgation of the one or more pending changes began.

* * * * *